Jan. 1, 1929.  
R. L. SOUSA  
AUTOMOBILE SHIPPING DECK  
Filed July 25, 1924

INVENTOR  
Romey L. Sousa  
BY  
Blackmore, Spencer & Flint  
ATTORNEYS

Patented Jan. 1, 1929.

1,697,790

UNITED STATES PATENT OFFICE.

ROMEY L. SOUSA, OF FLINT, MICHIGAN.

AUTOMOBILE SHIPPING DECK.

Application filed July 25, 1924. Serial No. 728,196.

This invention relates to decks or supports used in shipping automobiles in freight cars, and is illustrated as embodied in a foldable or collapsible deck which can be returned for reuse. In one desirable arrangement, the deck element supporting one end of each axle consists of a pair of supporting and bracing legs, illustrated as being arranged in V relation when in use, connected by a novel foldable brace, thus forming in effect an A shaped rack. Preferably each element has a long and a short leg, and the two elements on the same side of the automobile are arranged with the long legs intersecting and detachably secured together. When used in "half decking", the legs may be the same length, and if desired a third central leg may be added.

One of the advantages to be derived from collapsible decks of this design is that in their return by freight much less space is required in the freight car by reason of their compact character, this being an element of much importance in the fixing of freight rates.

The above and other features of the invention, including various novel and desirable particular constructions, will be apparent from the following description of two illustrative embodiments shown in the accompanying drawings, in which.

Figure 1:
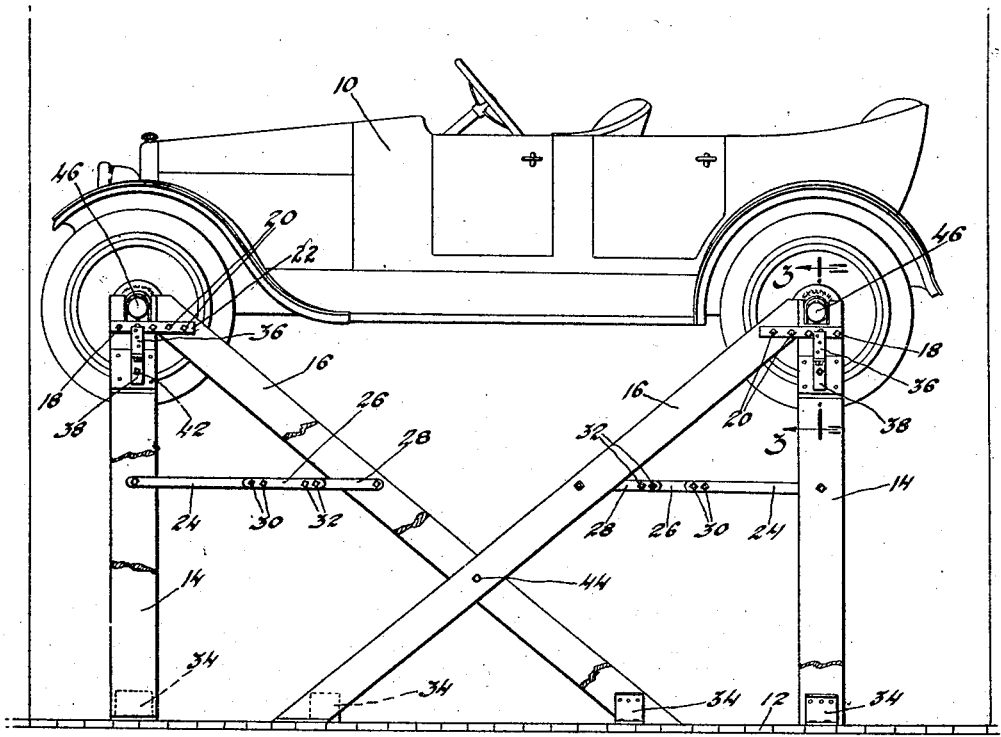
Figure 1 is a side elevation of an automobile supported in a freight car by my novel deck.
Figures 2, 3:
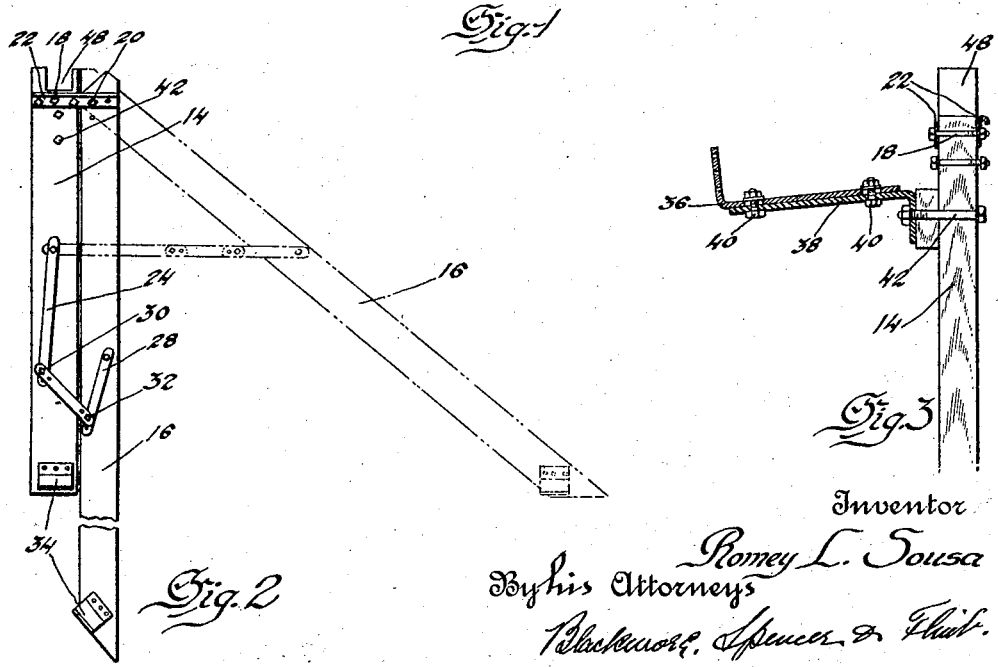
Figure 2 is a side elevation of the deck collapsed or folded for return shipment.
Figure 4:
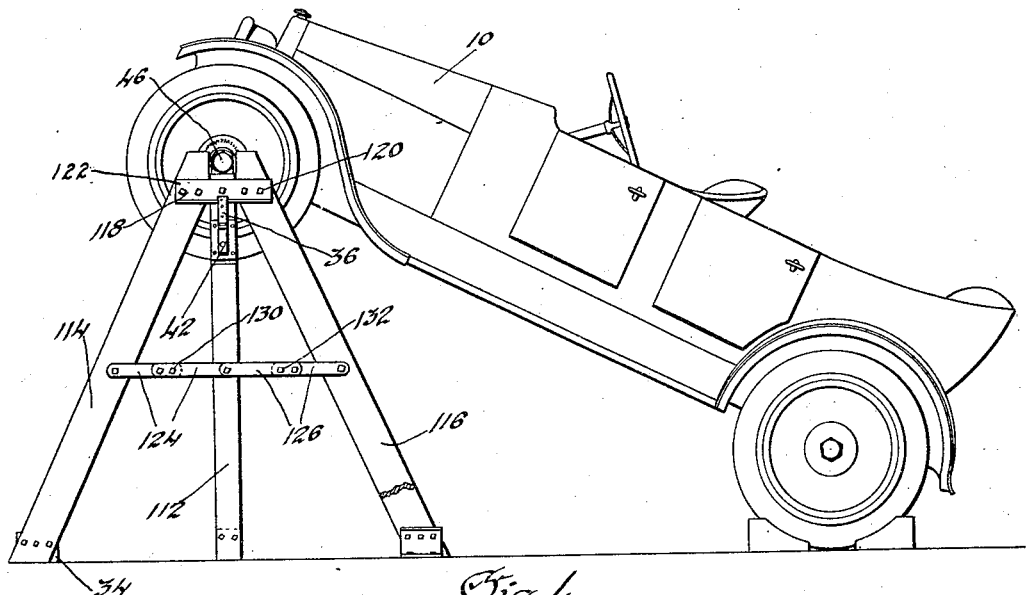
Figure 5:
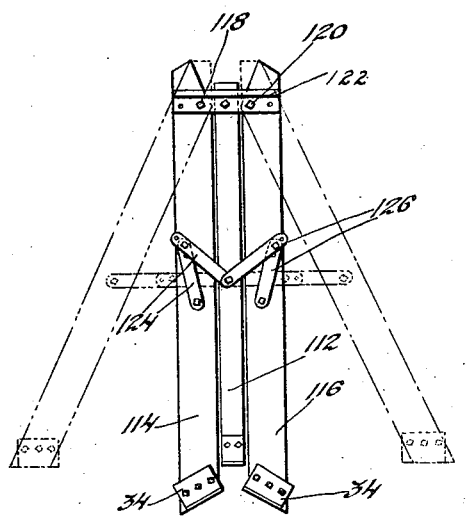
Figure 6:
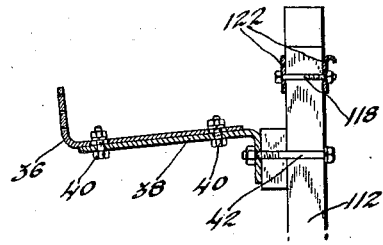

Figure 3 is a section on the line 3—3 of Figure 1, of the top of the deck, showing the adjustable side brace; and Figures 4, 5, and 6 are views corresponding respectively to Figures 1, 2, and 3, but showing a half deck, this being one modification of my invention.

In the arrangement illustrated in Figures 1, 2, and 3, an automobile 10 is supported by the deck at a sufficient height above the floor 12 of a boxcar (the sides of which are not shown) to permit of the introduction of a second automobile beneath it. The deck comprises four deck elements, two on each side of the automobile, each supporting one end of one of the axles, or one of the wheels, preferably by engagement with the wheel hub, or by engagement with the end of the axle inside of the wheels, or at the wheel spindle if the wheels are removed.

Each deck element is shown as comprising a short leg 14 and a long leg 16 connected by bolts 18 and 20 passing through metal ties 22, and in use diverging downwardly in V relation and inclined outwardly sufficiently to clear the fenders of the lower automobile. The legs are connected by a foldable tension brace in three sections 24, 26, and 28, sections 24 and 28 being bolted respectively to legs 14 and 16, and section 26 in use being secured to sections 24 and 28 by pairs of bolts 30 and 32, to form a substantially rigid brace. In folding the deck element as shown in Figure 2, one of each pair of bolts 20, 30, and 32 is removed, permitting the structure to be folded or collapsed with the legs 14 and 16 side by side.

Legs 14 and 16 may be secured to the floor 12 by means of sheet metal feet 34 nailed to the legs and adapted to be nailed to the floor 12. The deck element is braced to the side wall of the boxcar (not shown) by metal angle brackets 36 and 38, adjustably secured together by bolts 40, and fastened to leg 14 by bolts 42. Brackets 36 and 38 may be adjusted to fit freight cars of different widths.

Preferably the two deck elements on the same side of the automobile are arranged with the long legs 16 crossing each other and detachably secured together by a bolt 44 (Figure 1). In the illustrated arrangement, which is very convenient for loading and unloading, the automobile is supported by its hubs 46 resting in notches 48 cut in the tops of the legs 14.

In the embodiment selected for illustration in Figures 4, 5, and 6, and which is intended for half decking, bracing legs 114 and 116 are of substantially the same length, and the hub is directly supported on a center supporting leg 112. Legs 114 and 116 are secured by bolts 118 and 120 to metal cross pieces 122 carried by leg 112, and are braced by folding braces 124 and 126 respectively. Each pair of braces 124 and 126 is rigidly held when in use by bolts 130 and 132. The adjustable side brackets 36—38 are shown fastened to the center leg 112. For return shipment the deck is folded as shown in Figure 5.

While two illustrative embodiments have been described in detail, it is not my intention to limit the scope of the invention to those particular embodiments, or otherwise than by the terms of the appended claims.

I claim:

1. A collapsible and reusable automobile shipping deck comprising, in combination, a pair of supporting and bracing legs, a connection between said legs permitting a relative pivotal movement, means to make said connection rigid when the legs are in extended position, means to secure said legs to a car floor, a laterally extending and adjustable member to brace said legs to the side wall of the car and a cross-brace connecting the legs and foldable to permit the legs to be held side by side for return shipment.

2. A collapsible and reusable automobile shipping deck comprising, in combination, a pair of supporting and bracing legs connected at their upper ends and diverging therefrom in V relation when in use supporting one end of the axle of an automobile, the connection between the upper ends of the legs including a removable element which when in place affords a rigid connection and when removed permits the legs to be swung relative to each other, means to secure said legs to a car floor, a laterally extending and adjustable member to brace said legs to the side wall of the car and a jointed brace rigidly connecting the legs when in use and foldable in sections to permit swinging the legs side by side to collapse the deck.

3. A collapsible automobile-supporting deck comprising, in combination, a central supporting leg, bracing legs diverging downwardly from the top of the supporting leg, means to pivotally connect said bracing legs to the supporting legs to permit them to be folded against the supporting leg, other means to make said connection a rigid one and foldable braces connecting the supporting leg and the bracing legs and a laterally adjustable side brace for said legs.

4. In a collapsible automobile shipping deck, a relatively short supporting leg, a relatively long bracing leg pivotally attached thereto, means to make the attachment rigid when the legs are extended, a jointed cross brace connecting the legs whereby the legs may be folded together into compact relation for shipping and a laterally adjustable side brace for said legs.

5. In a collapsible automobile shipping deck, a relative short supporting leg, a relatively long bracing leg, a connecting strip between the legs, bolts rigidly securing one of the legs to said strip, a pivot pin pivotally securing the other leg to said strip, means to make said last mentioned leg rigid with the strip, a link pivoted to each leg, means connecting adjacent ends of the link together, whereby the legs may be folded into collapsed relation or secured in extended relation to form a rigid support and a laterally adjustable side brace for said legs In testimony whereof I affix my signature.

ROMEY L. SOUSA.